United States Patent
Miyashita et al.

(10) Patent No.: US 8,767,117 B2
(45) Date of Patent: Jul. 1, 2014

(54) IMAGING DEVICE AND METHOD TO CORRECT THE FOCUS DETECTION PIXELS USING PERIPHERAL STANDARD PIXELS AND CORRECTING DEFECTIVE PERIPHERAL STANDARD PIXELS AS WELL IF FOUND

(75) Inventors: Takeshi Miyashita, Saitama (JP); Tomoyuki Kawai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 145 days.

(21) Appl. No.: 13/634,686

(22) PCT Filed: May 19, 2011

(86) PCT No.: PCT/JP2011/061489
§ 371 (c)(1),
(2), (4) Date: Sep. 13, 2012

(87) PCT Pub. No.: WO2011/155297
PCT Pub. Date: Dec. 15, 2011

(65) Prior Publication Data
US 2013/0002911 A1 Jan. 3, 2013

(30) Foreign Application Priority Data
Jun. 9, 2010 (JP) ................................. 2010-132079

(51) Int. Cl.
*H04N 5/232* (2006.01)
*G03B 13/00* (2006.01)

(52) U.S. Cl.
USPC .......................................... 348/350; 348/246

(58) Field of Classification Search
CPC ... H04N 5/2351; H04N 5/3675; H04N 9/045; H04N 5/2176; H04N 5/23212
USPC .......................... 348/350, 246, 247, 349, 345
See application file for complete search history.

(56) References Cited

U.S. PATENT DOCUMENTS 6,781,632 B1   8/2004 Ide
8,228,404 B2 *  7/2012 Kusaka .......................... 348/246
(Continued)

FOREIGN PATENT DOCUMENTS

JP    2000-244823 A    9/2000
JP    2000-305010 A   11/2000
(Continued)

OTHER PUBLICATIONS

English translation of the International Preliminary Report on Patentability and Written Opinion of the International Searching Authority (Forms PCT/IB/338, PCT/IB/373 and PCT/ISA/237) for International Application No. PCT/JP2011/061489, dated Jan. 24, 2013.

*Primary Examiner* — Sinh Tran
*Assistant Examiner* — Shahbaz Nazrul
(74) *Attorney, Agent, or Firm* — Birch, Stewart, Kolasch & Birch, LLP

(57) ABSTRACT

Pixel values of focus detection pixels are suitably corrected according to reducing occurrence of a residual error of correction. A digital camera ii includes a CCD, an AF detection circuit, a specific pixel correction unit and the like. The CCD has standard pixels and phase difference pixels arranged in a predetermined pattern on an imaging surface, and outputs an image signal of one frame. The AF detection circuit evaluates an in-focus state by referring to a pixel value of the phase difference pixels from the image signal. The specific pixel correction unit determines a first correction value by multiplying the pixel value of the phase difference pixels by a predetermined gain, and compares the first correction value with the pixel value of the standard pixels around the phase difference pixels. If the first correction value is equal to or less than the maximum of those pixel values and equal to or more than their minimum, the pixel values of the phase difference pixels are replaced with the first correction value. Otherwise, the pixel values of the phase difference pixels are replaced with a second correction value obtained by averaging the pixel values of peripheral pixels.

16 Claims, 8 Drawing Sheets

(56) References Cited

U.S. PATENT DOCUMENTS

| | | | |
|---|---|---|---|
| 2009/0128671 A1* | 5/2009 | Kusaka | 348/246 |
| 2009/0207264 A1 | 8/2009 | Utsugi | |
| 2010/0245631 A1 | 9/2010 | Hoda et al. | |
| 2012/0162488 A1* | 6/2012 | Ogawa | 348/246 |
| 2012/0212654 A1* | 8/2012 | Nagata | 348/247 |
| 2012/0224087 A1* | 9/2012 | Hoda et al. | 348/247 |
| 2012/0236185 A1* | 9/2012 | Ishii | 348/246 |
| 2012/0320241 A1* | 12/2012 | Sugawara | 348/246 |
| 2013/0155271 A1* | 6/2013 | Ishii | 348/222.1 |
| 2013/0271629 A1* | 10/2013 | Sambonsugi | 348/246 |

FOREIGN PATENT DOCUMENTS

| | | |
|---|---|---|
| JP | 2009-163229 A | 7/2009 |
| JP | 2009-303194 A | 12/2009 |
| JP | 2010-109922 A | 5/2010 |

* cited by examiner

IMAGING DEVICE AND METHOD TO CORRECT THE FOCUS DETECTION PIXELS USING PERIPHERAL STANDARD PIXELS AND CORRECTING DEFECTIVE PERIPHERAL STANDARD PIXELS AS WELL IF FOUND

TECHNICAL FIELD

The present invention relates to an imaging device in which an image sensor having focus detection pixels is incorporated, and more particularly, relates to an imaging device and image processing method for use in imaging by correcting data of the focus detection pixels.

BACKGROUND ART

An imaging device having an automatic focus adjusting function is widely used, such as a digital camera. Methods of the automatic focus adjusting (hereinafter referred to as AF) include an active type and a passive type. In the active type, infrared rays or ultrasonic waves are applied to an object to measure a distance according to a focusing position of the reflected light or time or the like until return of the reflected light. In the passive type, an object image obtained through the taking lens or the like is used to detect a focal length. Known AF functions of the passive type include a contrast detection method and a phase difference detection method. The contrast detection method adjusts the focus so as to maximize contrast of the image of an entire frame or in a specified area. The phase difference detection method adjusts the focus according to a relationship between image data output by two image sensors disposed with parallax (phase difference).

Recently, the imaging device for operating in the phase difference detection method with one image sensor at the time of the AF has been known, in which pixels (hereinafter referred to as phase difference pixels) structurally asymmetric in the horizontal (or vertical) direction are incorporated in the pixel arrangement of the one image sensor. The phase difference pixels, as described above, are pixels structurally asymmetric, and have a different characteristic such as a lower sensitivity than normal pixels. Portions of the phase difference pixels may be dim in the object image or is colored in a form of noise. In view of this, correction of data of the phase difference pixels in the object image is known in relation of the imaging device in which the image sensor with the phase difference pixels is used.

Two methods are known as correction of data of the phase difference pixels, namely, average correction and gain correction. The average correction is a correction method in which pixel values (brightness) of standard pixels adjacent to the periphery of the phase difference pixels are averaged and used as the pixel values of the phase difference pixels (Patent Document 1). The gain correction is the correction method for multiplying the pixel values of the phase difference pixels by a predetermine gain to increase the pixel values of the phase difference pixels (Patent Documents 1 and 2).

PRIOR ART DOCUMENTS

Patent Documents

Patent Document 1: Japanese Patent Laid-open Publication No. 2009-303194

Patent Document 2: Japanese Patent Laid-open Publication No. 2000-305010

SUMMARY OF INVENTION

Problems to be Solved by the Invention

Both of the average correction and the gain correction are known as the correction method of the phase difference pixels as described above. There are examples of the object image which can be corrected acceptably and which may has conspicuous noise as a result of the correction, according to features of the object image. The average correction is effective in good correction if the image is a low contrast image in which no high frequency edge component is present around the phase difference pixels. If the object image with the high frequency edge component around the phase difference pixels is corrected by the average correction, false coloring occurs due to the bendback as a drawback. The gain correction is available for suitable correction without being influenced even presence of the high frequency edge component around the phase difference pixels. On the other hand, in relation to the low contrast image without the high frequency edge component around the phase difference pixels, the pixel values is increased by multiplication of the gain, so that a drawback occurs in conspicuous noise. Specifically if there is noise created by flare, ghost or other light with an incident angle different from a normal incident angle, a difference in the sensitivity ratio occurs between the standard pixels and the phase difference pixels due to the noise component. The pixel values of the phase difference pixels cannot be corrected exactly by the gain correction.

This being so, the use of only one of the average correction and the gain correction as the correction method of the pixel values of the phase difference pixels may be degraded in the image quality after correcting the pixel values of the phase difference pixels according to feature of the object image, to create a so-called residual error of correction. It may be necessary to use the correction method discretely according to the feature of the object image or to reduce the residual error of correction.

As an example of selective use of the correction method according to the feature of the object image, an example disclosed in Patent Document 2 is known, in which existence of a high frequency component is detected, and the two correction methods are selectively used according to a result of the detection. If image processing of various functions such as gamma correction is carried out before correcting the pixel values of the phase difference pixels, image quality will be degraded with occurrence of false coloring and the like derived from a sensitivity difference between the phase difference pixels and the standard pixels. Normally, correction of the pixel values of the phase difference pixels is carried out before the image processing of various functions. Thus, it is difficult to detect the high frequency component which will be conspicuous only after being processed in the image processing of various functions. It may be impossible to carry out sufficient correction by the method of selecting only either one of the average correction and the gain correction according to a result of the detection of the pixel values described above.

An object of the present invention is to provide an imaging device and image processing method for suitably correcting a pixel value of a phase difference pixel by reducing occurrence of a residual error of the correction.

Means for Solving the Problems

In order to achieve the above object of this invention, an imaging device includes an image sensor, a focus evaluation unit, a first correction value determination unit and a focus detection pixel correction unit. The image sensor has standard pixels and focus detection pixels in a predetermined pattern on an imaging surface, for outputting an image signal of one frame from the pixels. The focus evaluation unit evaluates an in-focus state by referring to brightness of the focus detection pixels from the image signal of the one frame. The first correction value determination unit arithmetically determines a first correction value by multiplying the brightness of the focus detection pixels by a predetermined gain. The focus detection pixel correction unit compares brightness of the standard pixels of a predetermined number disposed around the focus detection pixels with the first correction value, and if the first correction value is in a normal value range equal to or less than a maximum of the brightness of the standard pixels of the predetermined number and equal to or more than a minimum of the brightness of the standard pixels of the predetermined number, replaces the brightness of the focus detection pixels with the first correction value, and if the first correction value is in a value range outside the normal value range, averages the brightness of the standard pixels of the predetermined number to determine a second correction value, for replacing the brightness of the focus detection pixels with the second correction value to correct the brightness of the focus detection pixels.

Preferably, there is a defective pixel correction unit for storing a position of a defective pixel with failure among the standard pixels, determining a third correction value by averaging brightness of the standard pixels without failure disposed around the defective pixel, and replacing brightness of the defective pixel with the third correction value, to correct the brightness of the defective pixel.

Preferably, if the defective pixel is plural defective pixels adjacent to one another to constitute a defective pixel set, the defective pixel correction unit averages brightness of the standard pixels disposed around the defective pixel set to determine the third correction value.

Preferably, there is a check unit for checking whether the defective pixel is adjacent to the focus detection pixels. The focus detection pixel correction unit, if the defective pixel is adjacent to the focus detection pixels, replaces the brightness of the focus detection pixels with the first correction value, to correct the brightness of the focus detection pixels.

Preferably, there is a check unit for checking whether the defective pixel is adjacent to the focus detection pixels. The focus detection pixel correction unit, if the defective pixel is adjacent to the focus detection pixels, replaces the brightness of the focus detection pixels with the third correction value in the defective pixel correction unit.

Preferably, if the defective pixel is adjacent to one of the focus detection pixels, the check unit registers a position of the one focus detection pixel for the defective pixel. The defective pixel correction unit designates the registered focus detection pixel as the defective pixel for correcting the brightness of the defective pixel, and replaces the brightness of the defective pixel and brightness of the registered focus detection pixel with the third correction value.

Preferably, the image sensor includes first and second pixel groups for operating in conditions discrete from one another. The focus detection pixel correction unit, if the first and second pixel groups operate for imaging in exposure times different from one another, uses the standard pixels in a common one of the pixel groups for the standard pixels of the predetermined number, and if the first and second pixel groups operate for imaging in an equal exposure time, uses the standard pixels in the first and second pixel groups for the standard pixels of the predetermined number.

An image processing method includes a focus evaluation step, a first correction value determination step and a focus detection pixel correction step. In the focus evaluation step, an in-focus state is evaluated by referring to brightness of focus detection pixels from an image signal of one frame output by an imaging unit in which standard pixels and the focus detection pixels are arranged in a predetermined pattern on an imaging surface. In the first correction value determination step, a first correction value by multiplying the brightness of the focus detection pixels by a predetermined gain is arithmetically determined. In a focus detection pixel correction step, brightness of the standard pixels of a predetermined number disposed around the focus detection pixels is compared with the first correction value, and if the first correction value is in a normal value range equal to or less than a maximum of the brightness of the standard pixels of the predetermined number and equal to or more than a minimum of the brightness of the standard pixels of the predetermined number, the brightness of the focus detection pixels is replaced with the first correction value, and if the first correction value is in a value range outside the normal value range, the brightness of the standard pixels of the predetermined number is averaged to determine a second correction value, for replacing the brightness of the focus detection pixels with the second correction value to correct the brightness of the focus detection pixels.

Effect of the Invention

It is possible according to the present invention to correct pixel values of phase difference pixels suitably while occurrence of a residual error of correction is reduced. Even if there is noise created by flare, ghost or other light with an incident angle different from a normal incident angle, the pixel values of the phase difference pixels can be corrected suitably.

MODE FOR CARRYING OUT THE INVENTION

Figure 1:
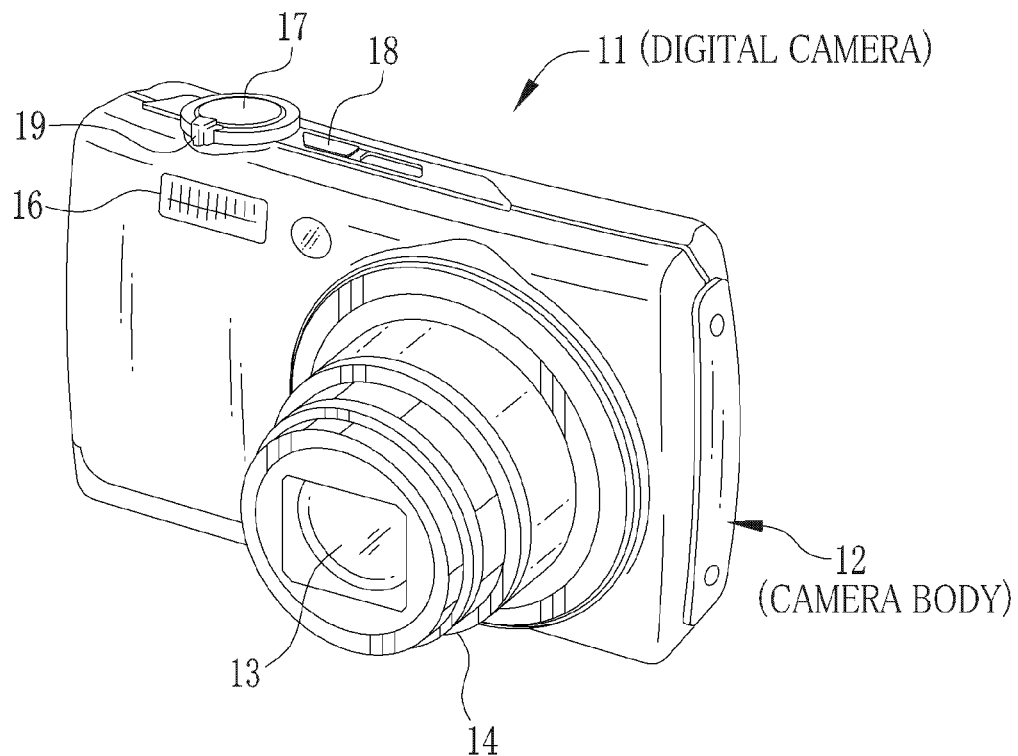
FIG. 1 is a front perspective view showing the digital camera.

As shown in FIG. 1, a digital camera 11 (imaging device) includes a lens barrel 14 and a flash light source 16 in front of a camera body 12 shaped substantially in a rectangular parallelepiped. The lens barrel 14 supports a taking lens 13. The flash light source 16 irradiates an object for capturing an image. A release button 17, a power source button 18 and a zoom lever 19 and the like are disposed on an upper surface of the camera body 12. The release button 17 operates for capturing an image. The power source button 18 changes over turning on and off of the power switch. The zoom lever 19 operates for zooming. The release button 17 is a switch depressible in two steps, and when depressed lightly (halfway), operates for preparation for capturing an image, such as AF. When the release button 17 is depressed (fully) further than the halfway depression, the digital camera 11 is controlled for capturing an image. An image signal of one frame after the preparation for capturing an image is converted into image data.

Figure 2:
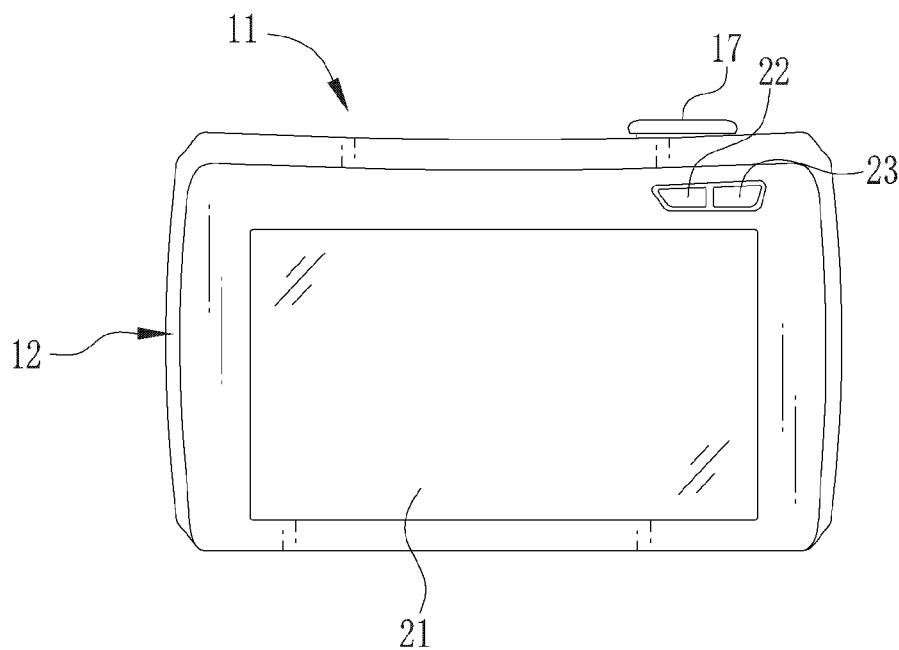
FIG. 2 is a rear view showing the digital camera.

As shown in FIG. 2, a back surface of the camera body 12 includes an LCD display 21, a mode selection button 22 and a menu button 23. The LCD display 21 displays an object image, a live image to appear in a through mode at the time of standby for capturing an image, and menu screens of various types. The mode selection button 22 is operated at the time of changing over the operation modes of the digital camera 11. In the digital camera 11 are determined the plural operation modes, which include a still image capturing mode for acquiring a still image, a moving image capturing mode for acquiring a moving image, a playback mode for playback of the respective acquired images in the LCD display 21. The operation modes are changed over by operating the mode selection button 22. The menu button 23 is operated to display the various menu screens in the LCD display 21.

Figure 3:
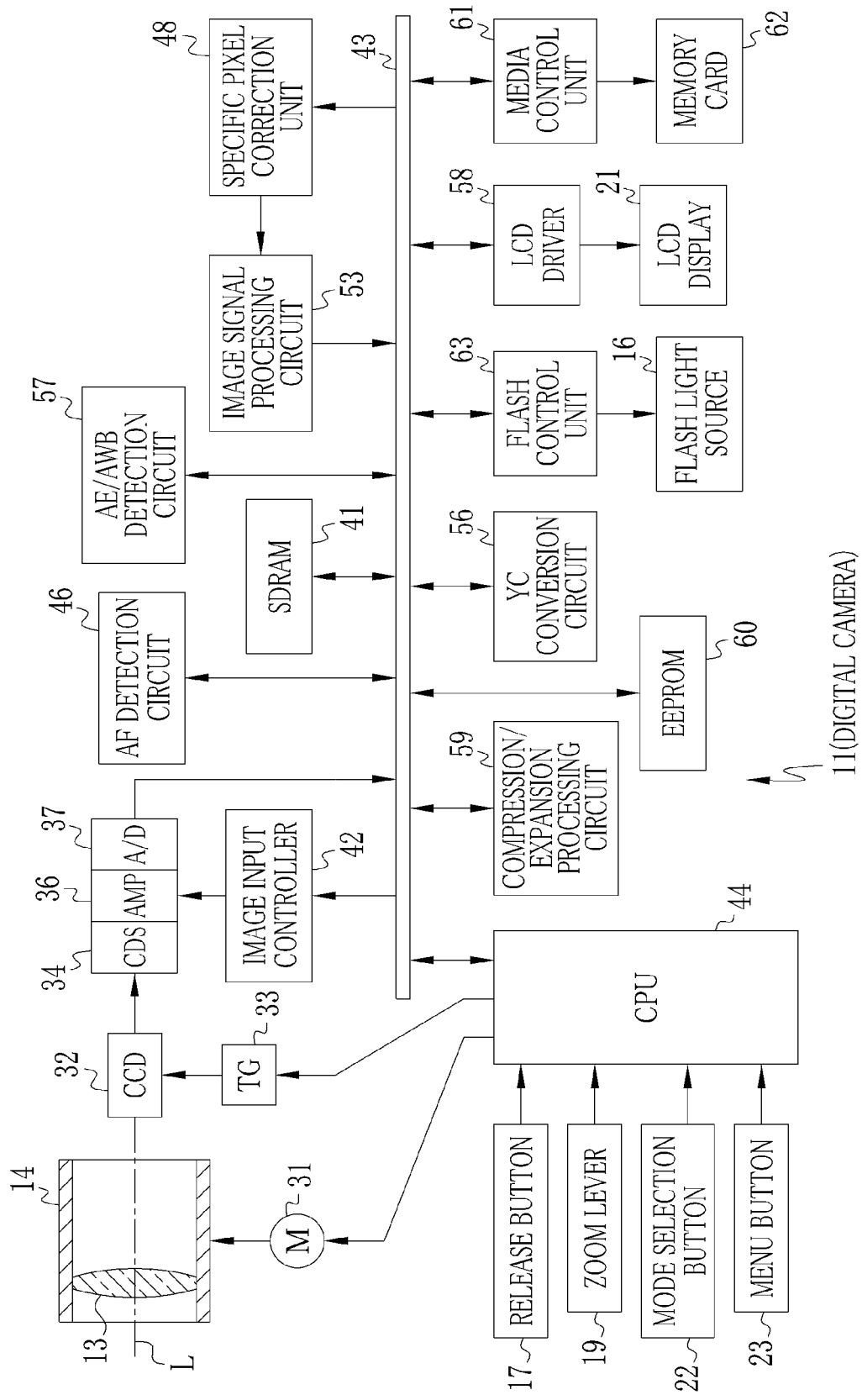
FIG. 3 is a block diagram showing electric arrangement of the digital camera.

As shown in FIG. 3, a motor 31 is connected to the lens barrel 14. The motor 31 transmits driving force to the lens barrel 14 by means of a transmission mechanism such as gears, and moves the lens barrel 14 forwards and backwards. The taking lens 13 is lens groups having plural lenses, which are simplified in the drawing. Intervals between the lenses change according to the forward and backward movement of the lens barrel 14. The taking lens 13 has an optical system for changing optical magnification, and also includes an aperture stop mechanism and a focusing lens. The aperture stop mechanism changes an opening area to adjust a light amount for capturing an image. The focusing lens moves in the optical axis direction L to adjust the focus of the taking lens 13.

An image sensor is disposed behind the taking lens 13 for capturing an object image focused by the taking lens 13, for example, a CCD 32. A timing generator (TG) 33 is connected to the CCD 32, of which a shutter speed and frame rate of an electronic shutter are determined according to a timing signal input by the TG 33. Plural values are preset for each of the shutter speed and frame rate, and are displayed in the LCD display 21 by depression of the menu button 23. The values are suitably changed by depression of the mode selection button 22 and the like.

The CCD 32 is an area image sensor in which pixels 32a are arranged on a plane for photoelectrically converting light from an object. (See FIG. 4.) The CCD 32 is unlike a normal type of area image sensor in which all pixels on an imaging plane are pixels of standard (hereinafter referred to as standard pixels) constructed substantially symmetrically with reference to the imaging optical axis L. The CCD 32 has pixels GAF (hereinafter referred to as phase difference pixels) (see FIG. 4), disposed in plural predetermined positions on the imaging plane and offset asymmetrically with reference to the imaging optical axis L for masking of light from the object according to its incident angle. The phase difference pixels GAF are offset asymmetrically in either one of the vertical and horizontal directions with reference to the optical axis of the CCD 32. At the same time, one of the phase difference pixels GAF of which the upper (left) side is masked and one of the phase difference pixels GAF of which the lower (right) side is masked are combined as one pair, so as to arrange a plurality of the phase difference pixels GAF.

In an AF detection circuit 46, the pixel value of the phase difference pixels GAF described above is used for determining a focus evaluation value. Also, the phase difference pixels GAF, because of the asymmetric offset arrangement, have a characteristic of a smaller pixel value and a lower brightness than normal pixels. In relation to an object image which will be appear in the LCD display or stored in a memory card 62, a phase difference correction unit 47 for pixel correction corrects a pixel value (brightness value) of the phase difference pixels GAF. Position coordinates of the phase difference pixels GAF, a sensitivity ratio with the normal pixel, and a gain value (to be described later) for use in gain correction determined according to those are predetermined. These data are stored in an EEPROM 60 which will be described later.

The CCD 32 is connected to a correlation double sampling (CDS) circuit 34. An analog image signal is outputted in proportion to the stored charge of the pixels 32a of the CCD 32 while the CDS 34 eliminates noise from the same. The image signal from the CCD 32 is output by one frame as a unit. The image signal is amplified by an amplifier (AMP) 36, converted by an A/D converter 37 (A/D) into digital image data, which is stored in an SDRAM 41 temporarily. An image input controller 42 controls operation of the CDS 34, the AMP 36 and the A/D 37. The image input controller 42 is connected to a CPU 44 by a system bus 43, and controls operation of the CDS 34, the AMP 36 and the A/D 37 according to the command from the CPU 44.

The AF detection circuit 46 calculates a focus evaluation value of the taking lens 13 according to the image data digitalized by the A/D 37, and inputs the same to the CPU 44. The focus evaluation value is determined according to the phase difference detection by use of the pixel value of the phase difference pixels GAF. The CPU 44 moves the taking lens 13 to an in-focus position according to the focus evaluation value input by the AF detection circuit 46.

In the present embodiment, the pixels 32a include standard pixels for capturing, and the phase difference pixels GAF for capturing and the AF. The standard pixels include normal pixels which can operate normally, and defective pixels GNG without operation as designed according to a structural defect. (See FIG. 4.) The phase difference pixels GAF and the defective pixels GNG constitute specific pixels for which pixel correction (brightness correction) is required.

For the specific pixels, a specific pixel correction unit 48 reads the pixel value from the SDRAM 41 and corrects the pixel value simultaneously. The specific pixel correction unit 48 reads the pixel values of the pixels one after another, and simultaneously checks their position coordinates in comparison with data (coordinate data) of position coordinates of the phase difference pixels GAF and the defective pixels GNG stored in the EEPROM 60. In relation to the pixel of which the pixel value has been read, it is checked in which the pixel is included, the phase difference pixels GAF, the defective pixels GNG or the normal pixels.

Also, the specific pixel correction unit 48 uses at least one of the correction methods which are the gain correction and average correction for correcting the phase difference pixels GAF and the defective pixels GNG (brightness correction). The gain correction is a correction method of arithmetically determining a value (first correction value) by multiplying the read pixel value by a predetermined gain, to update a new pixel value with this value. The average correction is a correction method of arithmetically determining an average (second correction value) of pixel values of plural standard pixels disposed the nearest to the pixel of correction target and with the same color as the pixel of the correction target. A new pixel value is updated with this value.

Also, the specific pixel correction unit 48 corrects the pixel value of the defective pixel by the average correction. The specific pixel correction unit 48 determines the average of the pixel values (third correction value) of plural normal pixels disposed adjacently to the defective pixel, the average being a new pixel value of the defective pixel. If there is another defective pixel (hereinafter referred to as adjacent defective pixel) adjacent to the defective pixel of the reading of the pixel value, then the pixel value of the normal pixels disposed second nearest to the defective pixel of the correction target next to the adjacent defective pixel without referring to the pixel value of the adjacent defective pixel. The average correction is carried out by determining the average (third correction value) of the pixel values of those pixels. Consequently, when a plurality of defective pixels are adjacent to one another, the specific pixel correction unit 48 designates those as one large pixel set of the defective pixels, and carries out the average correction by use of the pixel value of the normal pixels disposed around the pixel set of the defective pixels. An image signal processing circuit 53 is supplied with the image data of which the pixel values of the phase difference pixels GAF and the defective pixel GNG are corrected by the specific pixel correction unit 48.

The image signal processing circuit 53 is supplied with the image data of which the pixel value of the phase difference pixels GAF is corrected by the phase difference correction unit 47. The image signal processing circuit 53 processes the image data for image processing of various functions, such as gradation conversion, white balance correction, gamma correction and the like, and writes the image data to the SDRAM 41 again.

A YC conversion circuit 56 reads the image data from the SDRAM 41 after the image processing of the various functions in the image signal processing circuit 53, and converts the image data into a luminance signal Y and chrominance signals Cr and Cb. The YC data is stored in the SDRAM 41 again.

An AE/AWB detection circuit 57 determines a photometric value of brightness of the object according to a product of the luminance signal Y and the chrominance signals Cr and Cb, and sends a result of the determination to the CPU 44. The CPU 44 according to the photometric value sent from the AE/AWB detection circuit 57 checks suitability of the exposure amount and the white balance, and controls operation of the aperture stop mechanism of the taking lens 13, the CCD 32 and the like for optimizing those amounts.

An LCD driver 58 reads the YC data from the SDRAM 41, converts this into a composite signal of an analog form, and causes the LCD display 21 to display an image. Also, the LCD driver 58 outputs image data to the LCD display 21 successively, the image data being created according to the image signal successively output by the CCD 32, so that a live image is displayed by the LCD display 21.

A compression/expansion processing circuit 59 converts the YC data into a file format of a predetermined form, and creates a still image file and moving image file. The obtained still image file and moving image file are object images.

Various operable elements are connected to the CPU 44, such as the release button 17, the zoom lever 19, the mode selection button 22 and the menu button 23. When the operation of the operable elements is detected, a signal of the detection is input to the CPU 44. Also, the CPU 44 is connected by the system bus 43 to the elements of the digital camera 11 by means of a driver or the like, and supplied with inputs by the operable elements described above or the elements of the digital camera 11. The CPU 44 sends a control signal to the elements of the digital camera 11 according to the signals to control the entirety of the digital camera 11.

A media control unit 61 accesses the memory card 62 mounted in a media slot (not shown) in a removable manner, and reads or writes the captured object image. A flash control unit 63 responds to a flash signal transmitted from the CPU 44, and causes the flash light source 16 to flash.

The EEPROM 60 is provided in the digital camera 11. The EEPROM 60 initially stores a program, coordinate data of the phase difference pixels GAF and the defective pixel GNG, a gain for use in the gain correction, and the like. The program is read by the CPU 44, and operates the digital camera 11.

Figure 4:
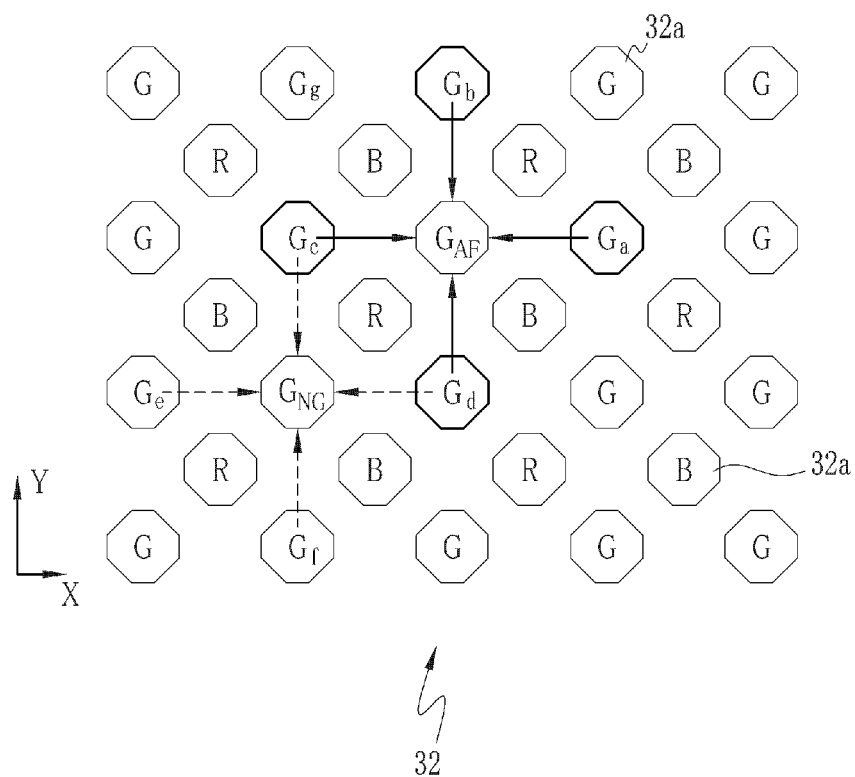
FIG. 4 is an explanatory view showing pixel arrangement of a CCD and pixels for use in correcting phase difference pixels.

As shown in FIG. 4, the pixels 32a of the CCD 32 are arranged in a honeycomb arrangement, and are respectively disposed at a grid point defined by rotating the rectangular grid by 45 degrees. R, G and B at the pixels 32a indicate colors of the color filters, and are adjusted at a proportion of red (R):green (G):blue (B)=1:2:1. Lines of arranging the R and B pixels (X direction) are alternately with lines of arranging only the G pixels and with a shift of disposition of the pixels 32a as much as a ½ pixel for each of the lines. In the CCD 32, the X direction corresponds to a horizontal direction (longitudinal direction) of the digital camera 11. The Y direction corresponds to a vertical direction (crosswise direction) of the digital camera 11.

The pixels 32a include phase difference pixels offset asymmetrically in the X direction (or Y direction). In the embodiment shown in FIG. 4, part of the G pixels where a green color filter G is disposed is made the phase difference pixel GAF. A defective pixel without normal operability may be included in the standard pixels for the image pickup. In FIG. 4, one of the G pixels is the defective pixel GNG. Pixels other than the phase difference pixels GAF and the defective pixel GNG are normal pixels operating normally.

Among pixels to which the specific pixel correction unit 48 refers to for the purpose of correcting the pixel value of the phase difference pixels GAF, the pixel values of the G pixels Ga-Gd of the same color the nearest to each of the phase difference pixels GAF are referred to. Similarly, for the average correction of the pixel value of the defective pixel GNG in the specific pixel correction unit 48, the pixel values of the G pixels Gd, Gc, Ge and Gf positioned similar to the correction of the phase difference pixel GAF are referred to around the defective pixel GNG. Let peripheral pixels herein be standard pixels of the same color about and the nearest to a center which may be the phase difference pixel GAF or the defective pixel GNG to be corrected. In FIG. 4, the peripheral pixels of the phase difference pixel GAF are the G pixels Ga-Gd. The G pixels Gd, Gc, Ge and Gf are peripheral pixels of the defective pixel GNG.

The operation of the digital camera 11 is described now. The power source button 18 is depressed to start up elements of the digital camera 11. After this, the mode selection button 22 is depressed to select one of a still image mode and moving image mode, to set the digital camera 11 in the standby state. The CPU 44 controls the TG 33 when the digital camera 11 is set in the standby state, to drive the CCD 32 with a timing signal output by the TG 33. The CPU 44 drives the CCD 32 according to a shutter speed and frame rate determined by a user with a menu screen. The CCD 32 in response to the timing signal from the TG 33 outputs an image signal according to an object image focused by the taking lens 13 on an imaging surface. Image data after digitalizing the same is stored in the SDRAM 41 temporarily.

The AF detection circuit 46, in response to the command from the CPU 44, reads the digitalized image data from the SDRAM 41, determines a focus evaluation value according to the pixel value of the phase difference pixel GAF included in the image data, and inputs the same to the CPU 44 (focus evaluation step). The CPU 44 drives the motor 31 according to the focus evaluation value, and moves the taking lens 13 to the in-focus position.

At the same time as the AF operation, the specific pixel correction unit 48 reads the same digital image data from the SDRAM 41 as read by the AF detection circuit 46, corrects pixel values of the phase difference pixels GAF and the defective pixel GNG, and inputs the pixel values to the image signal processing circuit 53. The image signal processing circuit 53 processes the image data of all the pixels for the image processing of various functions such as gamma correction and the like, the image data including the corrected image data of the phase difference pixels GAF and the defective pixel GNG and image data of normal pixels. The image data after the image processing of the various functions in the image signal processing circuit 53 is processed for the YC conversion in the YC conversion circuit 56, and then displayed in the LCD display 21. Also, an object image is created by the compression/expansion processing circuit 59 according to the image data, and stored to the memory card 62.

Figure 5:
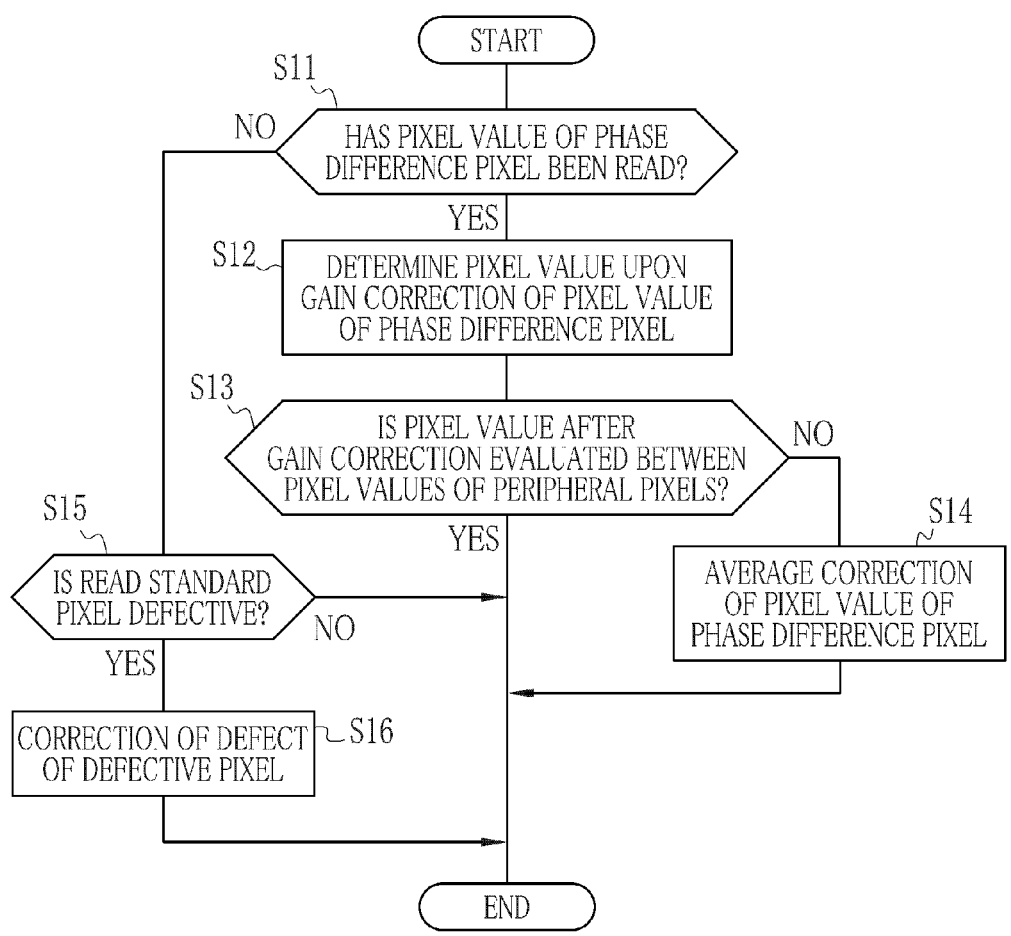
FIG. 5 is a flowchart showing an embodiment for correcting a pixel value of the phase difference pixels.

Correction of the pixel values of the phase difference pixels GAF and the defective pixel GNG in the specific pixel correction unit 48 (brightness correction) is carried out in the process of FIG. 5. At first, the specific pixel correction unit 48 reads pixel values of the pixels of image data one after another in the course of reading the image data from the SDRAM 41. Simultaneously, the specific pixel correction unit 48 compares the position coordinates of the pixel of the reading of the pixel value with the coordinate data of the phase difference pixels GAF, and checks whether the pixel of the reading of the pixel value is a phase difference pixel GAF or not (step S11).

If the pixel of reading of the pixel value is a phase difference pixel GAF, the specific pixel correction unit 48 arithmetically determines a pixel value corrected by gain correction of the pixel value of the phase difference pixel GAF (step S12, first correction value determination step). The specific pixel correction unit 48, upon reading the pixel value of the phase difference pixel GAF, reads a gain α predetermined for the phase difference pixel GAF from the EEPROM 60, multiplies the same by an initial pixel value CV of the reading of the image data, and determines the pixel value α.CV corrected by the gain correction of the pixel value CV of the phase difference pixel GAF.

Then the specific pixel correction unit 48 acquires the pixel value of the peripheral pixels Ga-Gd (see FIG. 4) for the phase difference pixel GAF, and compares the pixel value α.CV of the phase difference pixel GAF corrected by the gain correction with respective pixel values of the peripheral pixels Ga-Gd (see FIG. 4). (Step S13, focus detection pixel correction step.) If the pixel value of the phase difference pixel GAF corrected by the gain correction is equal to or smaller than the maximum among the pixel values of the peripheral pixels Ga-Gd, and also is equal to or larger than the minimum among those (normal value range), then the specific pixel correction unit 48 operates for the gain correction of the pixel value of the phase difference pixel GAF by replacing the read pixel value CV of the phase difference pixel GAF with the pixel value α.CV. For example, let CVa, CVb, CVc and CVd be pixel values of the peripheral pixels Ga-Gd. Let CVa be the maximum of those. Let CVd be the minimum of those. If the condition CVd≤α.CV≤CVa is satisfied, then the initial pixel value CV of the phase difference pixel GAF is replaced with the pixel value α.CV corrected by the gain correction.

On the other hand, if the pixel value α.CV corrected by the gain correction is larger than any pixel value of the peripheral pixels Ga-Gd (α.CV>CVa, CVb, CVc and CVd), or if the pixel value α.CV corrected by the gain correction is smaller than any pixel value of the peripheral pixels (α.CV<CVa, CVb, CVc and CVd), then the specific pixel correction unit 48 corrects the pixel value of the phase difference pixel GAF by the average correction (step S14, focus detection pixel correction step). In both of those conditions, the specific pixel correction unit 48 determines the average value of $CV_{AVE}$ of the pixel values CVa, CVb, CVc and CVd of the peripheral pixels Ga-Gd, and replaces the initial pixel value CV with the average $CV_{AVE}$ of the pixel values of the peripheral values in relation to the pixel value of the phase difference pixel GAF.

Thus, the specific pixel correction unit 48, upon reading the pixel value of the phase difference pixels GAF, corrects the pixel value of the phase difference pixels GAF read by either one of the gain correction and the average correction.

In the step S11, if the position coordinates of the pixel of the reading of the pixel value have not been registered in coordinate data of the phase difference pixels GAF, namely if the pixel of the reading of the pixel value is not a phase difference pixel GAF, then the specific pixel correction unit 48 checks the position coordinates of the pixel of the reading of the pixel value in comparison with the coordinate data of the defective pixel GNG, and checks whether the pixel of the reading of the pixel value is the defective pixel GNG (step S15). If the position coordinates of the pixel of the reading of the pixel value have not been registered in coordinate data of the defective pixel GNG, and if the pixel of the reading of the pixel value is not a phase difference pixel GAF or a defective pixel GNG, then the specific pixel correction unit 48 judges that the pixel of the reading of the pixel value is a normal pixel. For the normal pixel, the read pixel value is determined as a pixel value of the pixel itself without carrying out the gain correction or the average correction.

On the other hand, if the position coordinates of the pixel of which the pixel value is read are registered in the coordinate data of the defective pixel GNG, namely if the pixel of which the pixel value is read is the defective pixel GNG, then the specific pixel correction unit 48 corrects the pixel value of the defective pixel GNG according to the average correction (step S16). For example, if all of the peripheral pixels Gd, Gc, Ge and Gf (See FIG. 4) of the defective pixel GNG are normal pixels, the pixel values of the peripheral pixels Gd, Gc, Ge and Gf are averaged. In relation to the pixel value of the defective pixel GNG, the originally read pixel value is replaced with the obtained average of the pixel values of the peripheral pixels Gd, Gc, Ge and Gf. Should defective pixels be included in the peripheral pixels Gd, Gc, Ge and Gf of the defective pixel GNG, the defective pixel GNG and their adjacent defective pixels are designated as one defective pixel set. The pixel values of the peripheral pixels around the defective pixel set are averaged, so that their average becomes a pixel value of the defective pixel GNG.

Figure 6:
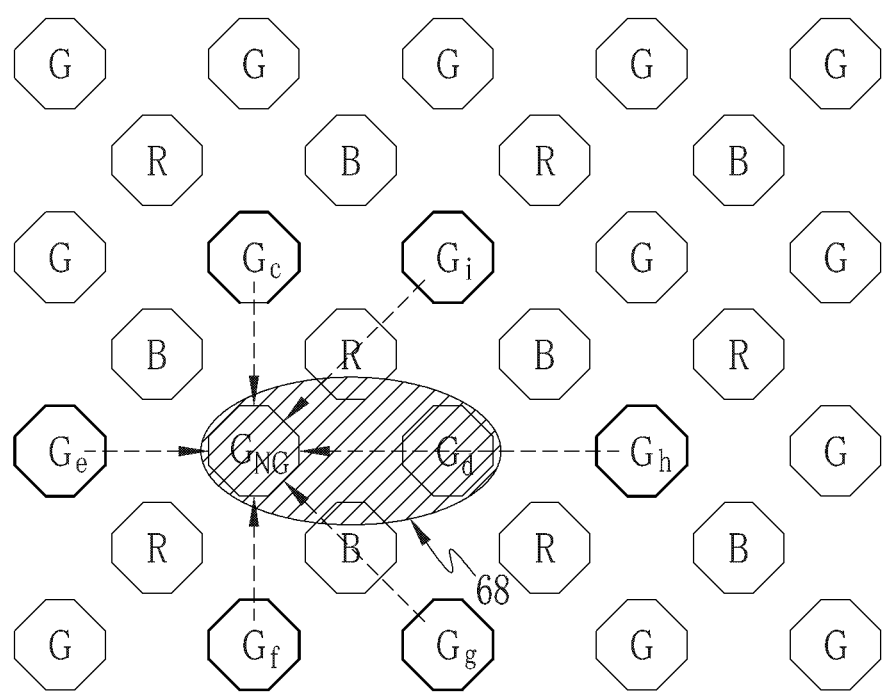
FIG. 6 is an explanatory view showing an embodiment for correcting the pixel value of defective pixels by average correction if the defective pixels are present and is adjacent to the defective pixels.

For example, let the peripheral pixel Gd on the right side be a defective pixel (adjacent defective pixel) as shown in FIG. 6 for correcting the pixel value of the defective pixel GNG. The specific pixel correction unit 48 designates the defective pixel GNG and the peripheral pixel Gd as a defective pixel set 68.

Then G pixels Gc, Ge, Gf, Gg, Gh and Gi the nearest to the defective pixel set 68 are set as peripheral pixels. An average of the pixel values of those pixels is determined. The pixel value of the defective pixel GNG is replaced from the initial pixel value with the determined average.

Among the pixels of the image data, pixel values of all the phase difference pixels GAF are corrected by the gain correction or average correction. Pixel values of all the defective pixels GNG are corrected by the average correction. The specific pixel correction unit 48 inputs the image data to the image signal processing circuit 53 after completion of the correcting the pixel values of all of the specific pixels GAF and GNG. The image signal processing circuit 53 processes the image data input from the specific pixel correction unit 48 and the image data of normal pixels in the image processing of various functions, before the YC conversion circuit 56 processes the same in the YC conversion. Then the compression/expansion processing circuit 59 converts the image data into a still image (moving image) file, which is stored to the memory card 62 as a recording image or is displayed by the LCD display 21 as a live image.

As described heretofore, the digital camera 11 is an imaging device with the phase difference pixels GAF for the focus detection for the purpose of the AF in the phase difference detection method with one image sensor. The pixel value of the phase difference pixels GAF is corrected by the gain correction or average correction to obtain an object image. At this time, the digital camera 11 checks whether the gain correction is suitable or not as a method of correcting the pixel value of the phase difference pixels GAF by comparison of the pixel value α.CV corrected by the gain correction with the pixel value of the peripheral pixel in place of the initial pixel value CV of the phase difference pixels GAF. Therefore, it is checked whether the pixel value of the phase difference pixels GAF should be corrected by the gain correction or by the average correction with reference to the pixel value α.CV at the time of the gain correction in place of the initial pixel value C of the phase difference pixels GAF, so as to facilitate the correction of the pixel value of the phase difference pixels GAF in a correction method with which a residual error of the correction will not occur easily in the object image.

For example, a low contrast image with a comparatively small change in the brightness in relation to the pixel pitch is present in the vicinity of the phase difference pixel GAF for correction of the pixel value. If the pixel value of the phase difference pixel GAF is corrected by the gain correction, a ratio of the noise component increases relatively to the peripheral pixels. Thus, the pixel value α.CV of the phase difference pixel GAF corrected by the gain correction is likely to be higher than that of the peripheral pixels. However, suitability of the gain correction is checked directly by comparing the pixel value of the peripheral pixels with the pixel value α.CF corrected by the gain correction. A residual error of correction due to the gain correction is likely not to appear.

If an image with a relatively largely changeable brightness relative to the pixel pitch (image of a high frequency component) is located near to the phase difference pixel GAF for correction of the pixel value, a width between the maximum and minimum of the pixel value of the peripheral pixel is large owing to the feature of this image. The pixel value α.CV corrected by the gain correction is likely to come between pixel values of the peripheral pixels. The pixel value of the phase difference pixel GAF can be corrected easily by the gain correction. A residual error of the correction is not likely to occur in the digital camera 11 after carrying out the average correction to the high frequency image.

Specifically if there is noise created by light of an angle different from a normal incident angle, such as flare, ghost and the like, it is likely that a sensitivity ratio between the phase difference pixels GAF and the normal pixels is different from that at the time without noise, because of the asymmetric offset arrangement of the phase difference pixels GAF. Thus, correction of the pixel value of the phase difference pixels GAF by the gain correction with the noise component is likely to create a residual error of the correction because the pixel value α.CV corrected by the gain correction is remarkably larger (smaller) than pixel values of the peripheral pixels. However, it is possible with ease to select the average correction in which a residual error of the correction is not likely to occur even with the noise component, by checking whether the gain correction is suitable or not in directly comparing the pixel value α.CV corrected by the gain correction with the pixel value of the peripheral pixels.

Also, the pixel value α.CV corrected by the gain correction, not being compared with a value defined by quantifying features of an image close to the phase difference pixels GAF, is directly compared with the pixel value of the peripheral pixel. The above-described features will not substantially change even after the image processing in the image signal processing circuit 53 for the various functions. For example, the condition of the pixel value α.CV between pixel values of the peripheral pixels is common for various states before and after the image processing for the various functions. Thus, the correction method where a residual error of the correction will not occur easily is readily selected in the digital camera 11 even before the image processing in the image signal processing circuit 53 for the various functions.

If the pixel values of all the phase difference pixels GAF are corrected, comparatively long time must be spent. This is because complicated arithmetic processing requires time for quantifying information of whether an image near to the phase difference pixels GAF is low-contrast or with high frequency for correcting the pixel values of the phase difference pixels GAF. However, in the digital camera 11, a correcting method for the pixel values of the phase difference pixels GAF is selected according to an easy method having determination of the pixel value α.CV corrected by the gain correction and comparison with the pixel values of the periphery for largeness and smallness. It is possible, therefore, in the digital camera 11 to correct the pixel value of the phase difference pixels GAF easily in a short time also in preventing a residual error of the correction as described above.

In the above embodiments, the example has been described in which the specific pixel correction unit 48, upon determining the pixel value α.CV corrected by the gain correction, compares the pixel values of the peripheral pixels to the pixel value α.CV corrected by the gain correction irrespective of inclusion of the defective pixel GNG in the peripheral pixels for the purpose of correcting the pixel value of the phase difference pixels GAF, so as to select the correction method of the pixel value of the phase difference pixels GAF. However, the present invention is not limited to this. For example, it is preferable to check whether a defective pixel GNG is included in the peripheral pixels of the phase difference pixels GAF and select the correction method of the pixel value of the phase difference pixels GAF according to a result of the check.

Figure 7:
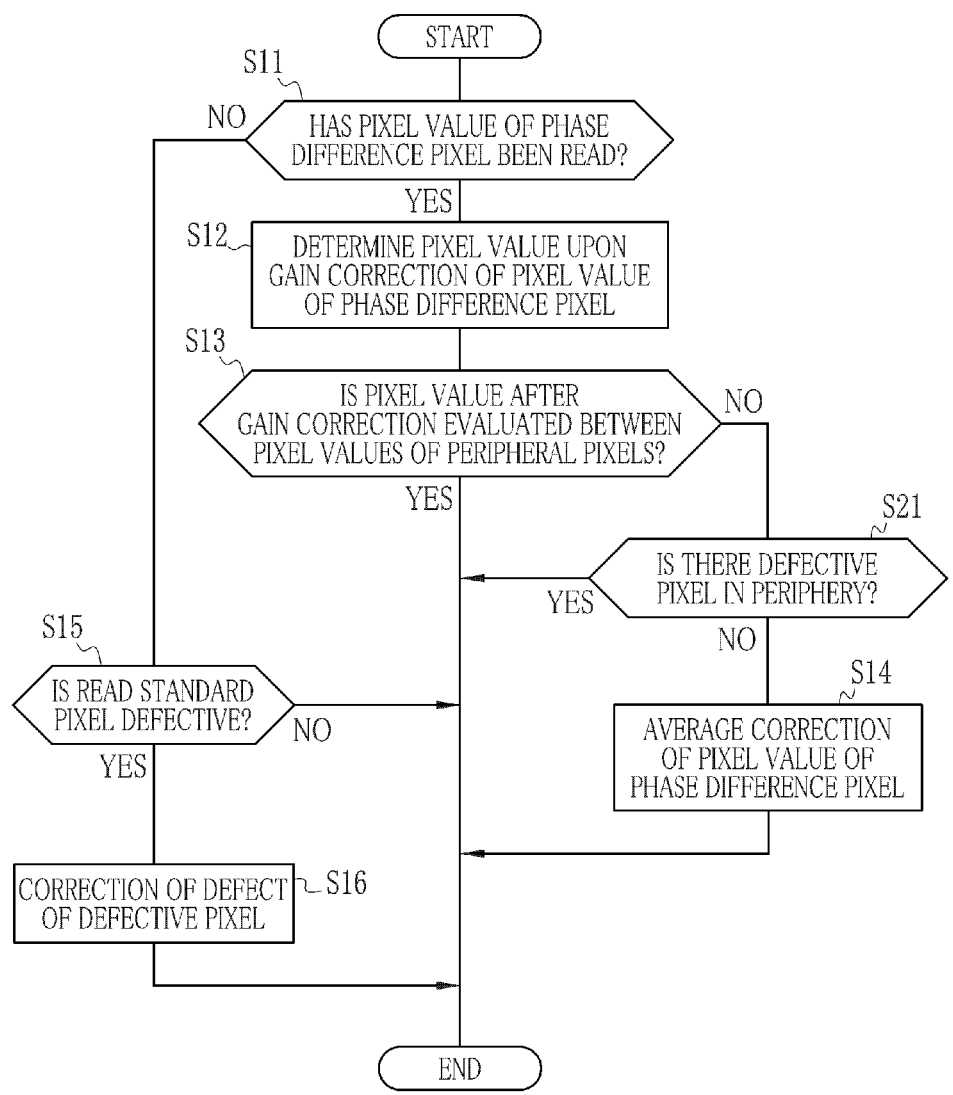
FIG. 7 is a flowchart showing an embodiment for correcting the pixel value of defective pixels by average correction if the defective pixels are disposed around the phase difference pixels.

As shown in FIG. 7, at first the pixel value α.CV corrected by the gain correction is obtained (S12) in the manner similar to the above embodiment, to check whether the value is between pixel values of the peripheral pixels (S13). If the pixel value α.CV corrected by the gain correction is between the pixel values of the peripheral pixels and if the gain correction is suitable for correcting the pixel value of the phase difference pixels GAF, only small influence occurs to the correction method of the pixel values of the phase difference pixels GAF and the corrected pixel value even if a defective pixel GNG is included in the peripheral pixels, because of the plurality of the peripheral pixels. Therefore, the specific pixel correction unit 48 corrects the pixel values of the phase difference pixels GAF by the gain correction in a manner similar to the above embodiment.

On the other hand, if the pixel value α.CV corrected by the gain correction is not between the pixel values of the peripheral pixels, the pixel value of the phase difference pixels GAF is corrected by the average correction in the above embodiment. In the average correction as described heretofore, the pixel values of the peripheral pixels directly influence the corrected pixel values of the phase difference pixels GAF. Therefore, the specific pixel correction unit 48 checks whether the defective pixel GNG is included in the peripheral pixels or not by use of the coordinate data of the defective pixel GNG for the purpose of correcting the pixel values of the phase difference pixels GAF by the average correction. It is determined (step S21) to correct the pixel value by the average correction according to a result of the check.

Should a defective pixel GNG be not included in the peripheral pixels, the pixel value of the phase difference pixels GAF is corrected by the average correction similar to the above embodiment. Should a defective pixel GNG be included in the peripheral pixels, the pixel value of the phase difference pixels GAF is corrected by the gain correction. Accordingly, the correction of the pixel value of the phase difference pixels GAF by the gain correction in the case of presence of the defective pixel GNG in the peripheral pixels is more likely to create a residual error of the correction than the correction of the pixel value by the average correction in the normal manner. However, expected values of the pixel values converted by the average correction cannot be obtained. A more unwanted residual error may occur upon the average correction by use of the pixel value of the defective pixel GNG. In consideration of this, a good object image can be easily created, as occurrence of a more unwanted residual error of the correction can be prevented.

It is checked herein whether a defective pixel GNG is included in the peripheral pixels after comparing the pixel value α.CV corrected by the gain correction with the pixel value of the peripheral value. It is possible to check whether a defective pixel GNG is included in the peripheral pixels at least before the average correction. Accordingly, the step S21 for checking presence of the defective pixel GNG in FIG. 7 can be before the step S14 of the average correction. For example, it is possible to check presence of the defective pixel GNG between the reading of the pixel value (S11) and the comparison of the pixel value α.CV with the pixel value of the peripheral pixels (between S11 and S12 or between S12 and S13).

The variant example has been described herein, in which it is checked whether the defective pixel GNG is included in the peripheral pixels, and the gain correction is selected simply if the defective pixel GNG is included in the peripheral pixels. However, the invention is not limited thereto. In the routine for correcting the pixel value of the phase difference pixels GAF, it is preferable to correct the pixel value of the phase difference pixels GAF by the average correction and to prevent occurrence of a residual error of the correction with treatment as the defective pixel without treatment as the phase difference pixels GAF.

Figure 8:
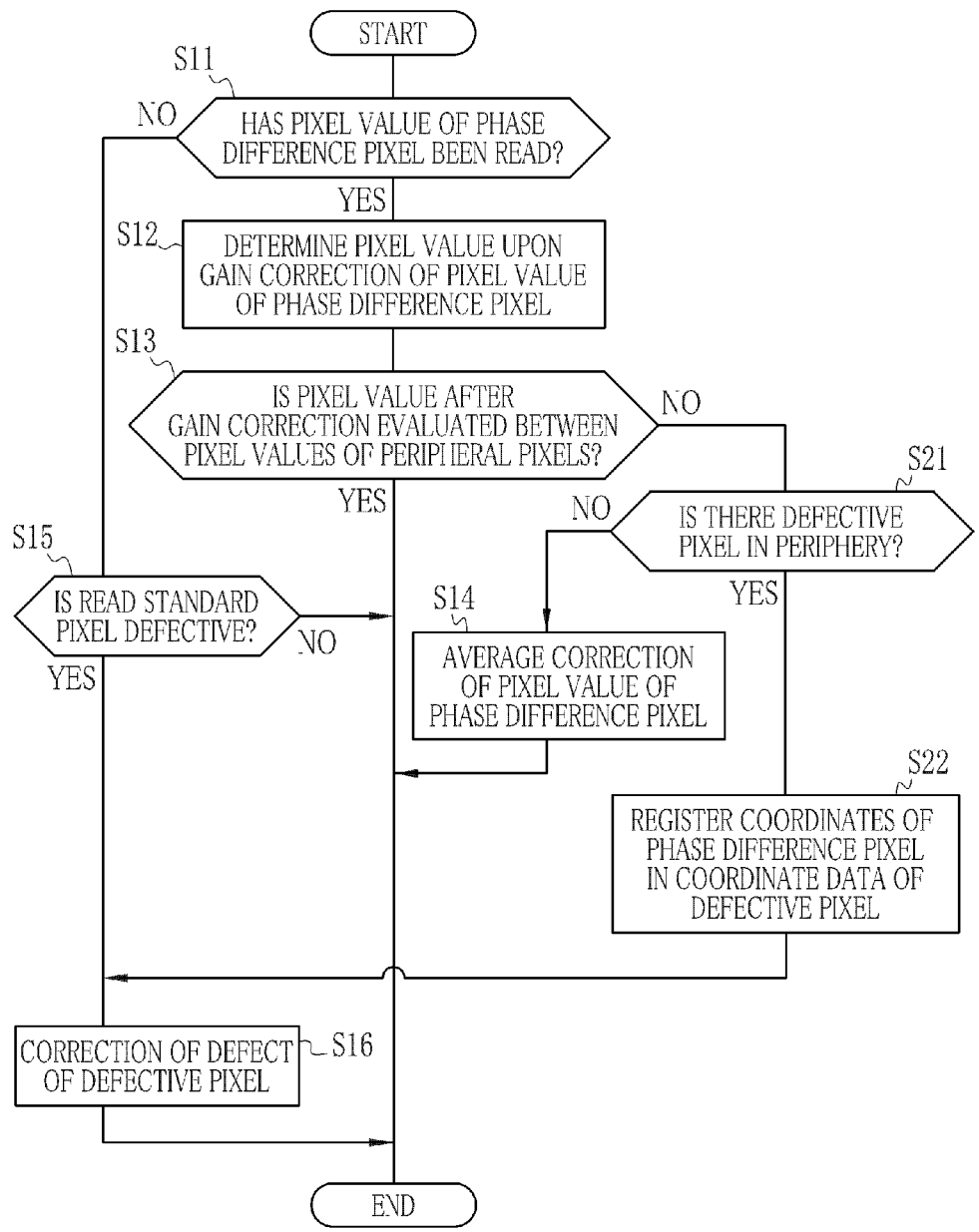
FIG. 8 is a flowchart showing an embodiment for correcting the pixel value of the phase difference pixels specifically preferably if the defective pixels are disposed around the phase difference pixels.

For example, if the pixel value α.CV corrected by the gain correction is larger (smaller) than the pixel value of the peripheral pixels as shown in FIG. 8 and unsuitable for the gain correction, then it is checked (step S21) whether the defective pixel GNG is included in the peripheral pixels of the phase difference pixel GAF as described above. If the defective pixel GNG is included in the peripheral pixels, the phase difference pixel GAF as correction target is registered (step S22) in coordinate data of the defective pixel as the defective pixel GNG.

Then the phase difference pixel GAF having been determined for treatment as the defective pixel GNG is corrected for their pixel value by the average correction in the method similar to that for the defective pixel GNG (step S16) described above. In short, the phase difference pixel GAF having been determined for treatment as the defective pixel GNG is designated as the defective pixel set 68 inclusive of the defective pixel GNG being adjacent. The pixel value of the phase difference pixel GAF is corrected by the average correction by use of peripheral pixels in the defective pixel set 68.

Thus, the phase difference pixel GAF of which the defective pixel GNG is included in the peripheral pixels is treated as the defective pixel GNG at the time of the average correction of the pixel value of the phase difference pixel GAF. Therefore, the pixel value of the phase difference pixel GAF can be corrected in the more suitable average correction. Also, the phase difference pixel GAF adjacent to the defective pixel GNG is registered as a defective pixel GNG. The phase difference pixel GAF of which a problem may occur with a corrected pixel value is not used at the time of the average correction of the pixel value of the defective pixel GNG with the specific pixel correction unit 48, so that the pixel value of the defective pixel GNG can be corrected. It is possible to reduce occurrence of a residual error of the correction even upon the correction of the pixel value of the defective pixel GNG.

Figure 9:
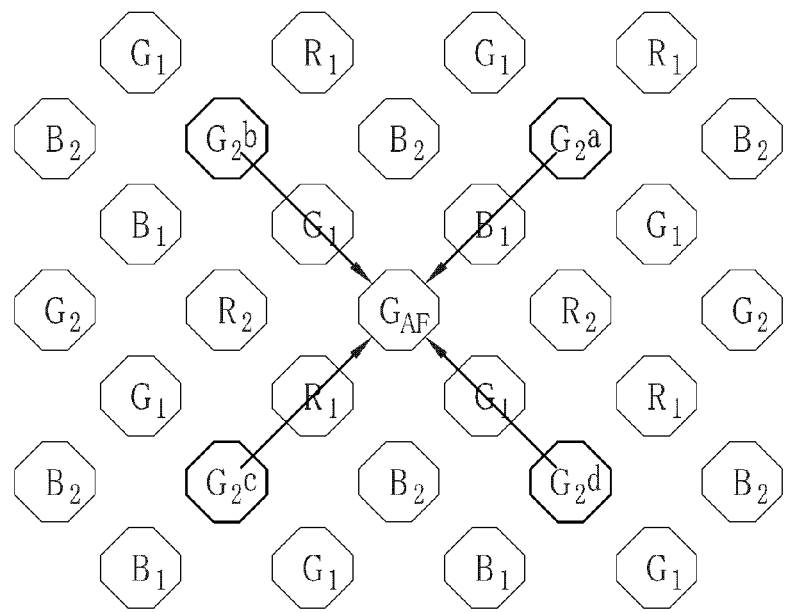
FIG. 9 is an explanatory view showing pixel arrangement of a CCD capable of simultaneously capturing two images at different exposure times.

In the CCD 32 of the honeycomb structure shown in FIGS. 4 and 6, lines (X direction) where the R and B pixels are arranged alternately are disposed alternately with lines where only the G pixels are arranged, with a position shift between the pixels as much as a ½ pixel in each of the lines. Furthermore, it is possible as shown in FIG. 9 to dispose lines where the G1 and B1 pixels are arranged alternately in the X direction, lines where the G2 and B2 pixels are arranged alternately in the X direction, lines where the G1 and R1 pixels are arranged alternately in the X direction, and lines where the G2 and R2 pixels are arranged alternately in the X direction, with a position shift between the pixels as much as a ½ pixel in each of the lines. The CCD has such a wired structure so that the exposure time can be controlled discretely between the pixels of a first pixel group with the index "1" and those of a second pixel group with the index "2". In FIG. 9, the phase difference pixel GAF is a G2 pixel of the second pixel group.

To use the present invention of the CCD of this pixel arrangement, pixels of the same groups as the phase difference pixel GAF are referred to among peripheral pixels for a difference in the exposure time (charge storing time) between the first and second pixel groups. For example, let the phase difference pixel GAF be provided in the second pixel group as shown in FIG. 9. G2 pixels G2$a$-G2$d$ are used as peripheral pixels among pixels in the second pixel group and disposed the nearest to the phase difference pixel GAF.

Figure 10:
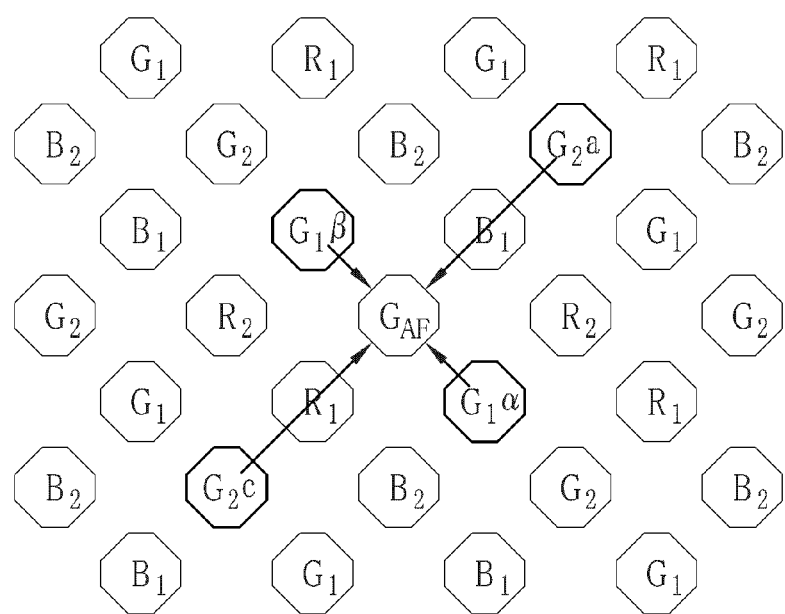
FIG. 10 is an explanatory view showing an embodiment for using all the pixels at an equal exposure time by use of the CCD capable of simultaneously capturing two images at different exposure times.

Even when the CCD with the pixel arrangement described above is used, it is likely to take an exposure at an equal exposure time between the first and second pixel groups. As shown in FIG. 10, pixels G2$a$ and G2$c$ as G2 pixels in the second pixel group in the manner described above, and pixels G1α and G1β as G1 pixels in the first pixel group and nearer to the phase difference pixel GAF than the G2 pixels, are used as peripheral pixels, for the purpose of correcting the pixel value of the phase difference pixel GAF in the second pixel group.

It is preferable to use the present invention for a normal image sensor in which pixels are disposed in a matrix form in addition to the CCD 32 of the honeycomb structure. For example, a CCD in which pixels are arranged in the Bayer arrangement can be used. It is possible in the present invention to use a CMOS type of image sensor in addition to the CCD 32.

Also, the red or blue pixels can be the phase difference pixels. Phase difference pixels can be provided in combination with pixels of plural colors. However, it is necessary to use a common color between the phase difference pixels of pairs in the case of providing the phase difference pixels in pixels of the plural colors.

In the above embodiments, the phase difference pixels GAF are disposed in predetermined positions of an imaging surface 72. However, specific arrangement of the phase difference pixels GAF can be determined as desired for specification of the digital camera 11 with possibility of the AF according to the pixel value of the phase difference pixels GAF. Also, the number of the phase difference pixels GAF can be determined as desired.

In the above embodiments, the pixel value of the four peripheral pixels Ga-Gd (see FIG. 4) disposed the nearest to the phase difference pixel GAF around the phase difference pixel GAF is referred to for the purpose of correcting the pixel value of the phase difference pixel GAF. Alternatively, it is possible to refer to, for example, the four peripheral pixels referred to in the above embodiments and also pixels of the same color disposed second nearest to the phase difference pixel GAF by way of the peripheral pixels.

In the above embodiments, the pixel value α.CV corrected by the gain correction is determined at the time of correcting the pixel value of the phase difference pixels GAF, and is compared with the pixel value of the peripheral pixels, before the pixel value of the phase difference pixels GAF is replaced by the gain correction or average correction. Alternatively, it is possible previously to correct the pixel value of the phase difference pixels GAF by the gain correction in a stage of reading image data in the specific pixel correction unit 48. For example, it is possible in the image input controller 42 to adjust the gain of the AMP 36 upon reading of the image signal of the phase difference pixels GAF from the CCD 32, so as to correct the pixel value of the phase difference pixels GAF in the gain correction in a stage of the analog signal. Thus, the arithmetic operation amount in the specific pixel correction unit 48 can be reduced by the correction according to the gain correction of pixel values of the phase difference pixels GAF in the stage of the analog signal. The correction of the pixel value of the phase difference pixels GAF can be carried out in a short time. Furthermore, the AF detection circuit 46 can determine the focus evaluation value in a manner similar to the above embodiments even after the gain correction of the pixel value of the phase difference pixels GAF in the stage of the analog signal.

In the above embodiments, the value obtained by simply averaging the pixel values of the peripheral pixels is the pixel value of those phase difference pixel GAF or defective pixel GNG at the time of average correction of the pixel value of the phase difference pixel GAF and average correction of the pixel value of the defective pixel GNG. However, the peripheral pixels may not be necessarily equidistant from the phase difference pixel GAF (the defective pixel GNG) to be corrected, in the case of the average correction of continuously arranged defective pixels GNG, or in the case of the average correction of the defective pixel GNG by treating the phase difference pixel GAF as the defective pixel GNG and constituting the continuously arranged defective pixels GNG according to the phase difference pixel GAF and the defective pixel GNG. It is preferable to use the average of the pixel value of the peripheral pixels as a new pixel value of the pixel to be corrected for the purpose of the average correction by use of the peripheral pixels being not equidistant from the pixel to be corrected, the pixel value of the peripheral pixels being determined by weighting according to distances of the peripheral pixels from the pixel to be corrected.

In the above embodiments, the digital camera 11 of the compact type has been described as example. It is possible to use the present invention in other imaging devices of any type in which the AF is used.

DESCRIPTION OF THE REFERENCE NUMERALS 11 digital camera
12 camera body
13 taking lens
32 CCD
32a pixels
68 defective pixel set
R, R1, R2 red pixels
G, G1, G2 green pixels
B, B1, B2 blue pixels
GAF phase difference pixel
GNG defective pixel
Ga-Gi peripheral pixels

The invention claimed is:
1. An imaging device comprising:
an image sensor, having standard pixels and focus detection pixels in a predetermined pattern on an imaging surface, for outputting an image signal of one frame from said pixels;
a focus evaluation unit for evaluating an in-focus state by referring to brightness of said focus detection pixels from said image signal of said one frame;
a first correction value determination unit for arithmetically determining a first correction value by multiplying said brightness of said focus detection pixels by a predetermined gain;
a focus detection pixel correction unit for comparing brightness of said standard pixels of a predetermined number disposed around said focus detection pixels with said first correction value, and if said first correction value is in a normal value range equal to or less than a maximum of said brightness of said standard pixels of said predetermined number and equal to or more than a minimum of said brightness of said standard pixels of said predetermined number, replacing said brightness of said focus detection pixels with said first correction value, and if said first correction value is in a value range outside said normal value range, averaging said brightness of said standard pixels of said predetermined number to determine a second correction value, for replacing said brightness of said focus detection pixels with said second correction value to correct said brightness of said focus detection pixels.
2. An imaging device as defined in claim 1, comprising a defective pixel correction unit for storing a position of a defective pixel with failure among said standard pixels, and correcting said brightness of said defective pixel according to brightness of said standard pixels without failure disposed around said defective pixel.

3. An imaging device as defined in claim 1, comprising a defective pixel correction unit for storing a position of a defective pixel with failure among said standard pixels, determining a third correction value by averaging brightness of said standard pixels without failure disposed around said defective pixel, and replacing brightness of said defective pixel with said third correction value, to correct said brightness of said defective pixel.

4. An imaging device as defined in claim 3, wherein if said defective pixel is plural defective pixels adjacent to one another to constitute a defective pixel set, said defective pixel correction unit averages brightness of said standard pixels disposed around said defective pixel set to determine said third correction value.

5. An imaging device as defined in claim 3, comprising a check unit for checking whether said defective pixel is adjacent to said focus detection pixels;
wherein said focus detection pixel correction unit, if said defective pixel is adjacent to said focus detection pixels, replaces said brightness of said focus detection pixels with said first correction value, to correct said brightness of said focus detection pixels.

6. An imaging device as defined in claim 3, comprising a check unit for checking whether said defective pixel is adjacent to said focus detection pixels;
wherein said focus detection pixel correction unit, if said defective pixel is adjacent to said focus detection pixels, replaces said brightness of said focus detection pixels with said third correction value in said defective pixel correction unit.

7. An imaging device as defined in claim 5, wherein if said defective pixel is adjacent to one of said focus detection pixels, said check unit registers a position of said one focus detection pixel for said defective pixel;
wherein said defective pixel correction unit designates said registered focus detection pixel as said defective pixel for correcting said brightness of said defective pixel, and replaces said brightness of said defective pixel and brightness of said registered focus detection pixel with said third correction value.

8. An imaging device as defined in claim 1, wherein said image sensor includes first and second pixel groups for operating in conditions discrete from one another;
wherein said focus detection pixel correction unit, if said first and second pixel groups operate for imaging in exposure times different from one another, uses said standard pixels in a common one of said pixel groups for said standard pixels of said predetermined number.

9. An imaging device as defined in claim 1, wherein said image sensor includes first and second pixel groups for operating in conditions discrete from one another;
wherein said focus detection pixel correction unit, if said first and second pixel groups operate for imaging in exposure times different from one another, uses said standard pixels in a common one of said pixel groups for said standard pixels of said predetermined number, and if said first and second pixel groups operate for imaging in an equal exposure time, uses said standard pixels in said first and second pixel groups for said standard pixels of said predetermined number.

10. An imaging device as defined in claim 1, wherein said predetermined pattern of said image sensor is honeycomb arrangement, and said predetermined number is four or more.

11. An imaging device as defined in claim 1, wherein said image sensor is a color image sensor having pixels of at least three colors, and said focus detection pixels are included in pixels of a predetermined one of said three colors.

12. An image processing method comprising:
a focus evaluation step of evaluating an in-focus state by referring to brightness of focus detection pixels from an image signal of one frame output by an imaging unit in which standard pixels and said focus detection pixels are arranged in a predetermined pattern on an imaging surface;
a first correction value determination step of arithmetically determining a first correction value by multiplying said brightness of said focus detection pixels by a predetermined gain;
a focus detection pixel correction step of comparing brightness of said standard pixels of a predetermined number disposed around said focus detection pixels with said first correction value, and if said first correction value is in a normal value range equal to or less than a maximum of said brightness of said standard pixels of said predetermined number and equal to or more than a minimum of said brightness of said standard pixels of said predetermined number, replacing said brightness of said focus detection pixels with said first correction value, and if said first correction value is in a value range outside said normal value range, averaging said brightness of said standard pixels of said predetermined number to determine a second correction value, for replacing said brightness of said focus detection pixels with said second correction value to correct said brightness of said focus detection pixels.

13. An image processing method as defined in claim 12, wherein a position of a defective pixel with failure among said standard pixels is stored, and said brightness of said defective pixel is corrected according to brightness of said standard pixels without failure disposed around said defective pixel.

14. An image processing method as defined in claim 12, wherein said imaging unit includes first and second pixel groups for operating in conditions discrete from one another;
wherein in said focus detection pixel correction step, if said first and second pixel groups operate for imaging in exposure times different from one another, said standard pixels in a common one of said pixel groups are used for said standard pixels of said predetermined number.

15. An image processing method as defined in claim 12, wherein said predetermined pattern of said imaging unit is honeycomb arrangement, and said predetermined number is four or more.

16. An image processing method as defined in claim 12, wherein said imaging unit is a color imaging unit having pixels of at least three colors, and said focus detection pixels are included in pixels of a predetermined one of said three colors.

* * * * *